UNITED STATES PATENT OFFICE.

EMIL ECKSCHLAGER, OF WINNIPEG, MANITOBA, CANADA, ASSIGNOR TO HERMAN SALTZMAN AND JULIUS GOUTMAN, BOTH OF WINNIPEG, MANITOBA, CANADA.

COMPOSITION OF MATTER.

1,067,413.   Specification of Letters Patent.   Patented July 15, 1913.

No Drawing.   Application filed January 24, 1913.  Serial No. 744,013.

*To all whom it may concern:*

Be it known that I, EMIL ECKSCHLAGER, a citizen of the Empire of Austria-Hungary, residing at the city of Winnipeg, in the Province of Manitoba, Canada, have invented a new and useful Composition of Matter to be Used for the Manufacture of Artificial Stone, of which the following is a specification.

My invention consists of the following ingredients, in the proportions substantially as stated, and prepared as described:

| | |
|---|---|
| Magnesium oxid | 45 pounds |
| Barium sulfate | 50 pounds |
| Lithopone | 5 pounds |
| Total | 100 pounds |

These ingredients are thoroughly mixed together, either mechanically or by manual means. I next make a solution of magnesium chlorid by adding thereto approximately 25 to 30 per cent. of water, or such amount as will make therewith a saturated solution, the solution being allowed to stand at least two days before using. To 100 pounds of the dry mixture I next add approximately 60 pounds of the magnesium chlorid solution, thoroughly mixing until the mass is in an easily workable plastic condition, or in such condition that it may be placed in molds, freely following the designs thereof.

As my composition of matter may be made to imitate marble very closely, when a smooth face is required, the material should be cast upon a mirror like surface. Owing to the fact, that my composition after being mixed, first cools and then heats, reaching its maximum heat in about 6 hours and becoming cool and solid in about 24 hours, the material upon which it is cast is a matter of importance. Anything of a brittle nature will not do, and if iron be used, owing to the affinity of the composition for that material, it is necessary that an affinity resisting material be interposed between the metal and the composition. I have found nickel plate a very preferable material upon which to make the castings.

While it is known that magnesium chlorid and magnesium oxid will combine to form a stone like substance, it is also known that the substance so formed is subject to rapid deterioration through its ready absorption of carbon, and atmospheric influences, I therefore overcome these defects and secure permanency by the addition of barium sulfate and lithopone.

The composition may be colored as required, by the addition of pigments, but these should preferably be of oxid origin to secure permanency.

What I claim is—

1. The herein described composition of matter, compounded in the manner, and in the quantities substantially as described, consisting of magnesium oxid, and magnesium chlorid, lithopone, barium sulfate and water, the barium sulfate forming the filler, and the magnesium oxid and magnesium chlorid forming an oxychlorid adapted to combine with and bind the barium to form a hard stone like substance, the lithopone entering into the composition, and giving thereto a smooth marble like surface and preventing the decomposition or sweating of said oxychlorid.

2. The herein described composition of matter, in the quantities substantially as follows, magnesium oxid forty five pounds, barium sulfate fifty pounds, lithopone five pounds, and solution of magnesium chlorid sixty pounds, the zinc contained in the lithopone forming with the magnesium oxid and magnesium chlorid a double oxychlorid, substantially secure from deterioration and adapted to bind and combine with the barium sulfate to form a hard, fine grained, smooth marble like substance.

3. The herein described composition of matter, compounded in the manner, and in the quantities substantially as described, consisting of magnesium oxid, magnesium chlorid, lithopone, barium sulfate, water and coloring matter, the magnesium oxid and magnesium chlorid forming an oxychlorid adapted to bind and combine with the barium sulfate to form a hard stonelike substance having both weight and strength, the lithopone entering into the composition and giving thereto fineness of grain and a smooth marble like surface, and the coloring matter providing a means whereby the natural tints and veining of marble may be closely imitated.

EMIL ECKSCHLAGER.

Witnesses:
HERMAN W. DICKEY,
HERBERT PATERSON.